United States Patent [19]

Miller

[11] 4,241,761
[45] Dec. 30, 1980

[54] MANIFOLD VALVE ASSEMBLY
[75] Inventor: William Miller, Westport, Conn.
[73] Assignee: Michael Ebert, Mamaroneck, N.Y.; a part interest
[21] Appl. No.: 2,027
[22] Filed: Jan. 9, 1979
[51] Int. Cl.³ .............................................. F16K 11/20
[52] U.S. Cl. .................................. 137/883; 137/884; 251/331
[58] Field of Search ............... 137/863, 883, 884, 886; 251/331

[56] References Cited
U.S. PATENT DOCUMENTS

| | | | |
|---|---|---|---|
| 588,765 | 8/1897 | Draullette | 251/331 |
| 2,613,082 | 10/1952 | Guild | 137/883 |
| 3,019,815 | 2/1962 | Lenardon et al. | 137/883 |
| 3,467,230 | 9/1969 | Brown | 251/331 X |
| 3,625,474 | 12/1971 | Juede | 137/883 X |
| 3,675,891 | 7/1972 | Reynolds et al. | 251/335 B X |
| 3,812,398 | 5/1974 | Kozel et al. | 251/331 |
| 3,874,630 | 4/1975 | Novey | 251/331 X |

FOREIGN PATENT DOCUMENTS 2385018 10/1978 France .................................. 251/331

Primary Examiner—Gerald A. Michalsky
Attorney, Agent, or Firm—Michael Ebert

[57] ABSTRACT

A manifold valve assembly for selectively interconnecting a row of ports to control the flow of fluid in the lines coupled thereto. The assembly includes a valve block in whose upper face is formed a shallow well. Extending from the well to a plane parallel to the lower face of the block is a row of cylinders whose lower ends define valve seats that communicate with ports projecting from the lower face. A channel indented in the well serves to laterally interconnect the mouths of the cylinders with each other. Seated in the well and sealing the mouths of the cylinders is a pad of elastomeric material from which is projected a row of hollow, axially-expandable nipples that extend into and are coaxially disposed within the cylinders, the nipples all having a normal length that falls short of the valve seats. Mounted above the valve block is an actuator block having a row of tubes therein in axial alignment with the cylinders. Supported in each tube is the retractable push rod of a spring-biased click mechanism. The lower end of each rod protrudes into a respective nipple, the upper end thereof being coupled to a normally-raised pushbutton. The arrangement is such that when a given button is pressed in, the push rod associated therewith is advanced axially to a degree limited by the click to cause the associated nipple to expand and engage the valve seat, thereby closing the valve. When this same button is again pressed in, the click is released to cause the rod to retract and thereby open the valve, the button then being returned to its raised position. Thus by operating the buttons, one may select the valves to be opened or closed and thereby connect the lines associated with the ports in any desired manner.

8 Claims, 5 Drawing Figures

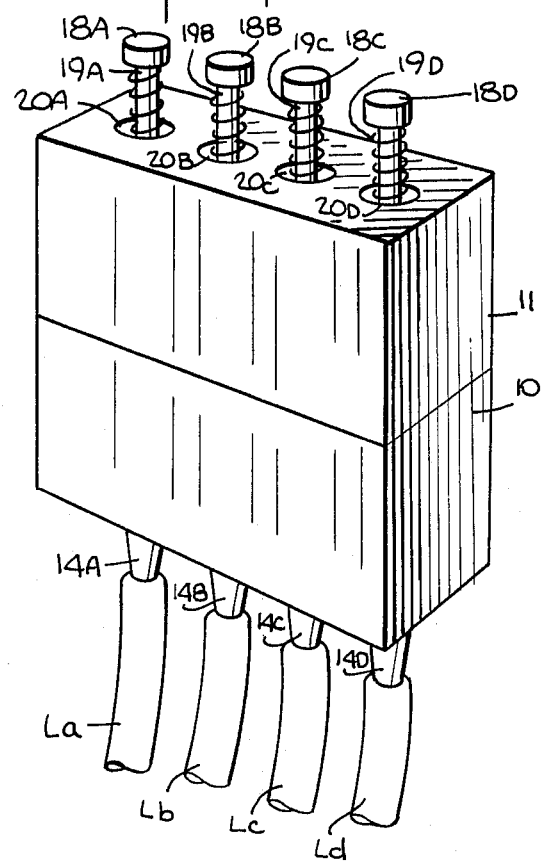
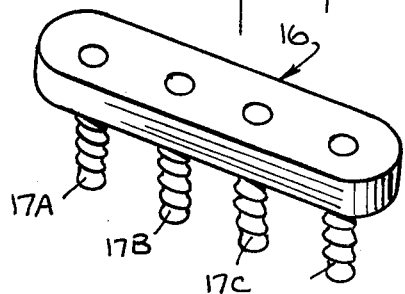
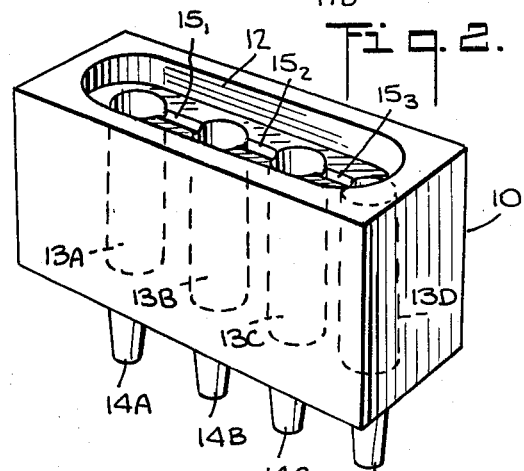
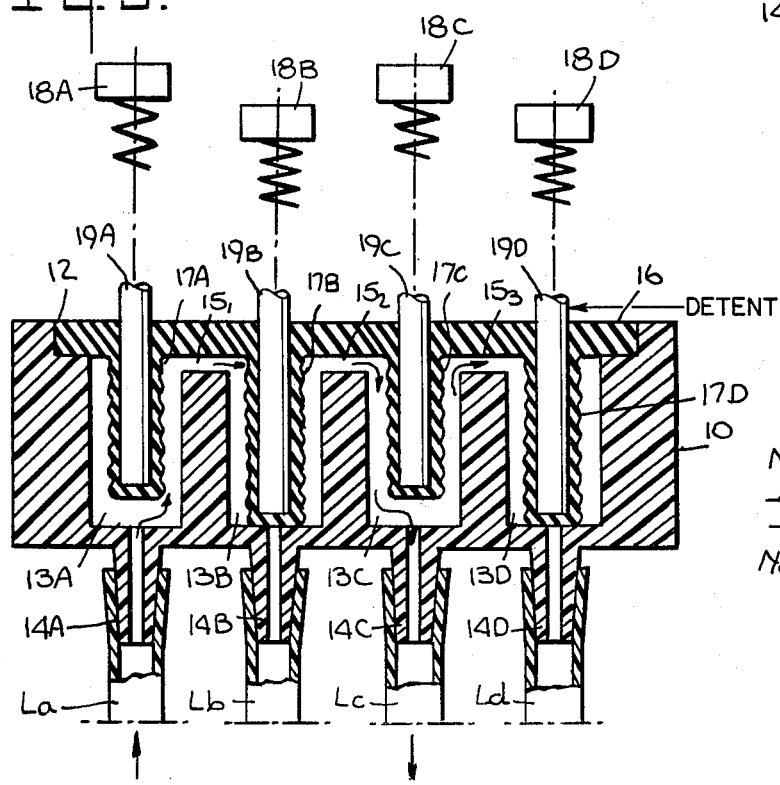
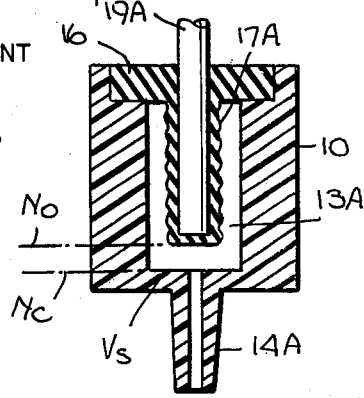

MANIFOLD VALVE ASSEMBLY

BACKGROUND OF INVENTION

This invention relates generally to manifold valve assemblies to selectively control the passage of fluid through a group of ports, and more particularly to a valve assembly having a row of click-type push-button actuators, one for each valve, to facilitate the selection of the valves and to indicate their operating status.

Many industrial, commercial and medical applications exist for a multi-port valve assembly adapted to direct an incoming fluid into one or more selected ports and to block flow into all other ports. For example, in intravenously supplying a saline or other solution to a patient by means of catheters inserted at various points in the vascular system of the patient or in a venous pressure measuring instrument such as that disclosed in the Miller et al. U.S. Pat. No. 3,807,389, in which fluid must be directed in various paths, the need exists for a selective valve mechanism capable of carrying out the desired procedures.

To this end, the common practice is to employ a multiposition stopcock whose structure is such that each setting thereof brings about a fluid connection between two or more lines in a network thereof while blocking all other lines. Because in such multi-position valves there is usually a single rotatable or adjustable valve member which cooperates with a group of ports that are interconnected or blocked, depending on the operative position of this member, the dimensional tolerances of the valve must be stringent. This factor makes such valves difficult and expensive to manufacture.

Moreover, such multi-position valves are relatively hard to operate. When the valve actuator is to be shifted or turned to a particular setting by one hand, the other hand of the operator must be used to grasp and steady the valve body. The operator must then exercise care in setting the valve actuator to the appropriate position for the desired line connections.

But apart from these practical limitations is the fact that conventional multi-position valves provide no positive indication of their operating status. Though an operator conversant with the valve and its port connections should know its status, this is subject to human error. For example, if, say, at position 3 of a particular multi-position valve, an input line is connected to the first output port of a group of four ports, all others then being blocked, and at position 4, the input line is connected to the second and fourth ports, all others then being blocked, these line connections are not evident merely from the setting of the valve actuator; for the operator must be informed as to the relationship of each setting to the line connections. Inasmuch as the operator, in the case of a medical application for the valve assembly, is generally a nurse with many other responsibilities, the likelihood of error is high.

Another factor that must be taken into account, particularly in medical and pharmaceutical uses, is the sterilizability of the valve; for contamination of the fluid being controlled must be avoided. When the valve is of the usual multiposition type having occluded surfaces, full and effective sterilization of all valve areas in contact with the fluid is very difficult to effect.

While various forms of manifold-type valves are known in the prior art provided with a row of valves which are separately and individually actuated, such manifold-type valves fail to satisfy the various requirements dictated by medical and other applications. Typical prior art patents disclosing manifold or gang type valve assemblies are those issued to Axelrod U.S. Pat. No. 3,459,221 and Stewart U.S. Pat. No. 3,552,436.

SUMMARY OF INVENTION

In view of the foregoing, the main object of this invention is to provide a manifold valve assembly for selectively interconnecting a row of ports to control the flow of fluid in the lines coupled thereto in a structural arrangement which within practical limits lends itself to any number of operative ports. Thus while an assembly in accordance with the invention can be embodied in a three-port structure, it is also feasible to construct a five or nine port structure operating on the same principles.

More particularly, it is an object of this invention to provide a manifold valve assembly in which each port can be individually controlled, whereby any one of the ports in the gang or row thereof may be intercoupled with one or more of the other ports, the remaining ports then being blocked.

Also an object of this invention is to provide a manifold valve assembly whose dimensional tolerances are far less stringent than those in prior art arrangements, and in which there exists a fixed seal around the area of the assembly requiring sterilization, there being no occluded surfaces within this area.

A significant feature of the invention resides in the fact that the valves of the assembly are push-button actuated and can be operated with a single hand. And because of this push-button arrangement, the assembly affords a positive indication of the status of each valve, for a closed valve condition is represented by a depressed button, and an open condition by a raised button.

Briefly stated, these objects are accomplished in an assembly in accordance with the invention which includes a valve block in whose upper face there is formed a shallow well, a row of cylinders whose mouths are flush with the base of the well extending from the well to a plane parallel to the lower face of the block to thereby define valve seats that communicate with a corresponding row of ports projecting from the lower face.

A channel indented in the base of the well serves to laterally interconnect the mouths of the cylinders with each other. Seated within the well and sealing the mouths of the cylinders is a pad of elastomeric material from which project a row of hollow axially-expandable nipples which extend into and are coaxially disposed with the cylinders, the nipples all having a normal length which falls short of the valve seats.

Mounted above the valve block is an actuator block having a row of tubes therein in axial alignment with the cylinders. Supported in each tube is the retractable push rod of a spring-biased click mechanism, the lower end of the rod protruding into a respective nipple, the upper end thereof being coupled to a normally raised push-button. The arrangement is such that when a given button is pressed in, the push rod associated therewith is advanced axially to a degree limited by the click to cause the associated nipple to expand and engage the valve seat, thereby closing the valve. When the same button is again pressed in, the click is released to cause the rod to retract, to thereby open the valve and return the button to its raised position.

Thus by manipulating the proper buttons, one may select those valves in the row which are to be opened or closed and thereby connect the lines associated with the ports in any desired manner. Since the closed valves are indicated by depressed buttons and the open valves by raised buttons, the position of the buttons in the row affords a positive indication of the status of the valves.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a manifold valve assembly in accordance with the invention;

FIG. 2 is a perspective view of the valve block of the assembly;

FIG. 3 is a perspective view of the elastomeric nipple pad which is inserted in the valve block;

FIG. 4 shows a single valve in the valve block and its relation to the expandable nipple therein; and FIG. 5 schematically illustrates the function of the manifold valve assembly.

DESCRIPTION OF INVENTION

Valve Structure:

Referring now to the drawings, and more particularly to FIGS. 1 and 2, there is shown a ganged manifold valve assembly which includes a valve block 10 and a similarly-dimensioned actuator block 11 joined thereto. Both blocks are preferably fabricated of a transparent synthetic plastic material such as nylon, polyethylene, "Teflon" or any other inert material of good structural strength that is non-reactive with the fluids to be controlled by the assembly and capable of being sterilized by standard autoclave or gas purification techniques.

Valve block 10 has a shallow well 12 indented in its top face. Bored in block 10 is a row of identical parallel cylinders 13A, 13B, 13C, and 13D, whose mouths are flush with the base of the well, the cylinders extending from the well to a plane adjacent to the lower face of block 10. Communicating with cylinders 13A to 13D and in axial alignment therewith is a row of corresponding ports 14A, 14B, 14C and 14D whose internal diameter is smaller than that of the cylinders. The junction of the cylinders and the ports define, as best seen in FIG. 4, a valve seat $V_s$.

Coupled to ports 14A to 14D are flexible pipes or lines $L_a$, $L_b$, $L_c$ and $L_d$ for conducting fluid. In practice, a fluid to be controlled may be fed into the assembly through line $L_a$ then serving as an input line, the assembly determining the selective distribution of this fluid through output lines $L_b$ to $L_d$. And while a gang of four valve cylinders and associated ports are illustrated, in practice as little as three or as many as five or more may be used; for the structure, within practical limits, inherently lends itself to a gang of any desired number.

The mouths of cylinders 13A to 13D are laterally interconnected by channel sections $15_1$, $15_2$ and $15_3$ indented in the base of the well so that if the line $L_a$ supplies fluid into cylinder 13A, this fluid is fed through these channel sections into cylinders 13B, 13C and 13D.

Seated in well 13 of the valve block and fully occupying the well space is a pad 16 of elastomeric material. In practice, this pad may be formed of natural or synthetic rubber, such as Neoprene or silicone rubber. The nature of the elastomeric material depends on the fluid to be controlled and must be compatible therewith. Pad 16 is bonded to the surface of the well and serves to hermetically seal the mouths of the cylinders.

Pad 16 is provided with a projecting row of tubular, axially-expandable nipples 17A to 17D whose mouths, which are accessible on the top of the pad, are open, the free ends of the nipples being closed. In practice, to facilitate expansion and retraction of the nipples, they are preferably in the form of bellows of elastomeric material.

Nipples 17A to 17D protrude into the correspondingly-lettered cylinders 13A to 13D and are coaxial therewith to provide fluid chambers surrounding the nipples. The normal length of each nipple, as shown in FIG. 4, is such that its free end reaches an open-valve point $N_o$ which falls short of valve seat $V_s$. When extended in a manner to be later described, the nipple sealably engages valve seat $V_s$ at point $N_c$ to close the valve.

As shown in FIG. 1, actuator block 11 is provided with a row of push-buttons 18A to 18D that are operatively coupled to push rods 19A to 19D, respectively, which pass through tubes 20A to 20D formed in the actuator block. These tubes are in registration with the correspondingly-lettered cylinders 13A to 13D in the valve block, the push rods extending fully into nipples 17A to 17D.

Push rods 19A to 19D are spring-biased and cooperate with a click mechanism disposed in tubes 20A to 20D. This mechanism is not shown, for it is of conventional construction of the type found, for example, in retractable ball point pens or in push-button keyboards for channel selectors in radio equipment.

Valve Operation:

The click mechanism operation is such that when a button, such as button 18A, is pressed in from its normally raised position, it then advances the associated push rod axially to stretch nipple 17A until point $N_c$ is reached to close the valve, this position being held by the detent or click.

When push-button 18A is again pressed in, it acts to release the detent, the button then returning from its depressed position to its normally-raised position at which the nipple is disengaged from the valve seat to open the valve.

The function of the assembly can best be understood from an examination of FIG. 5, where it will be seen that buttons 18A and 18C are raised, thereby opening the associated valves, whereas buttons 18B and 18D are depressed, thereby closing the associated valves.

With incoming fluid flowing into line $L_a$ and going through the first open valve cylinder 13A, the fluid is then distributed to the fluid chamber in the other three valve cylinders 13B, 13C and 13D. But since only cylinder 13C is open, fluid passes out of the chamber of this valve into line $L_c$, passage to the other lines being blocked. One can, of course, manipulate the buttons to cause the fluid to go out through lines $L_b$, $L_c$ and $L_d$ or only through line $L_c$ and $L_d$, or only through line $L_b$ or line $L_d$. It becomes possible, therefore, to provide any desired permutation of connections in a line network.

The status of the valves is positively indicated, in that raised buttons represent an open-valve condition, while depressed buttons reflect a closed-valve condition. When all of the valves are open, none of the active valve surfaces is occluded; hence the internal structures in contact with the fluid can be fully sterilized by conventional procedures for this purpose.

While there has been shown and described a preferred embodiment of a manifold valve assembly in accordance with the invention, it will be appreciated that many changes and modifications may be made therein without, however, departing from the essential spirit thereof. For example, instead of a click mechanism, the rods may be threadably received in the tubes of the actuator mechanism whereby by turning the rods in one direction by an end button, the rod is caused to advance axially to close the valve and by turning it in the reverse direction, the rod is retracted to open the valve.

I claim:

1. A manifold valve assembly for selectively interconnecting a group of lines to control the flow of fluid therethrough, said assembly comprising:

A a valve block having a row of cylinders formed therein which communicate at their lower ends with a row of ports projecting from the block and coupled to the respective lines in the group, the junction of said ports and cylinders defining valve seats, the upper ends of the cylinders being interconnected whereby fluid admitted into any cylinder in the row thereof flows into the other cylinders;

B a corresponding row of axially-expandable tubular nipples coaxially supported within the respective cylinders to define fluid chambers therein, said nipples having a normal length terminating at a first point that falls short of said valve seats, whereby each cylinder and nipple define a normally-open valve; and C a row of push-button actuated push rods projecting into said nipples; the buttons in the row having normally raised positions; each rod, when pushed in by pressing its associated button, acting to axially expand the related nipple to a second point in sealing engagement with the valve seat of the cylinder to close the valve, the rod being detented at said second point to maintain the associated button at a depressed position whereby when the associated button is again pressed to release the detent, it returns to its raised position at which the valve is open, the buttons in the row therefore being indicative of the status of the valves.

2. An assembly as set forth in claim 1, wherein said valve block has indented in its top face a well whose base is flush with the upper ends of the cylinders, said well being occupied by a pad of elastomeric material integral with said row of nipples.

3. An assembly as set forth in claim 2, wherein said pad and nipples are formed of rubber.

4. An assembly as set forth in claim 1, wherein said nipples have a bellows formation.

5. An assembly as set forth in claim 1, wherein said row of push-button actuated push rods is supported in an actuator block joined to said valve block.

6. An arrangement as set forth in claim 5, wherein said actuator block is provided with a row of tubes through which said rods extend.

7. An arrangement as set forth in claim 6, further including a click mechanism disposed in each tube.

8. An arrangement as set forth in claim 1, wherein there are at least four cylinders in said row thereof.

* * * * *